United States Patent [19]

Greenhill

[11] Patent Number: 5,299,895
[45] Date of Patent: Apr. 5, 1994

[54] RATCHETING THREADING TOOL

[76] Inventor: Wesley H. Greenhill, PO Box 111, Meadview, Ariz. 86444

[21] Appl. No.: 939,659

[22] Filed: Sep. 3, 1992

[51] Int. Cl.⁵ .......................... B23G 5/02; B25B 13/46
[52] U.S. Cl. ........................ 408/56; 408/123; 408/239 R
[58] Field of Search .............. 408/56, 120, 123, 238, 408/239 R, 240, 215, 221; 470/183, 207, 209

[56] References Cited

U.S. PATENT DOCUMENTS

| | | | |
|---|---|---|---|
| 925,289 | 6/1909 | Cain | 470/207 X |
| 2,145,762 | 1/1939 | Fox | 408/123 |
| 2,855,614 | 10/1958 | Simon | 408/56 |
| 3,715,168 | 2/1973 | Kuhn | 408/239 R |
| 4,097,182 | 6/1978 | Rolnick | 470/207 X |
| 4,213,723 | 7/1980 | Wagner | 408/239 A |
| 4,799,832 | 1/1989 | Abbot | 408/120 X |

Primary Examiner—Steven C. Bishop
Attorney, Agent, or Firm—Leon Gilden

[57] ABSTRACT

A tool member includes a ratchet head having a central polygonal aperture arranged to selectively receive a die holder member or alternatively, a collet assembly for mounting a threading tap. A second handle member is arranged for selective securement to the head in longitudinal alignment relative to a first handle mounted to the ratcheting head, wherein the first and second handles are arranged on opposed sides of the mounting head orthogonally oriented relative to the head's axis.

5 Claims, 4 Drawing Sheets

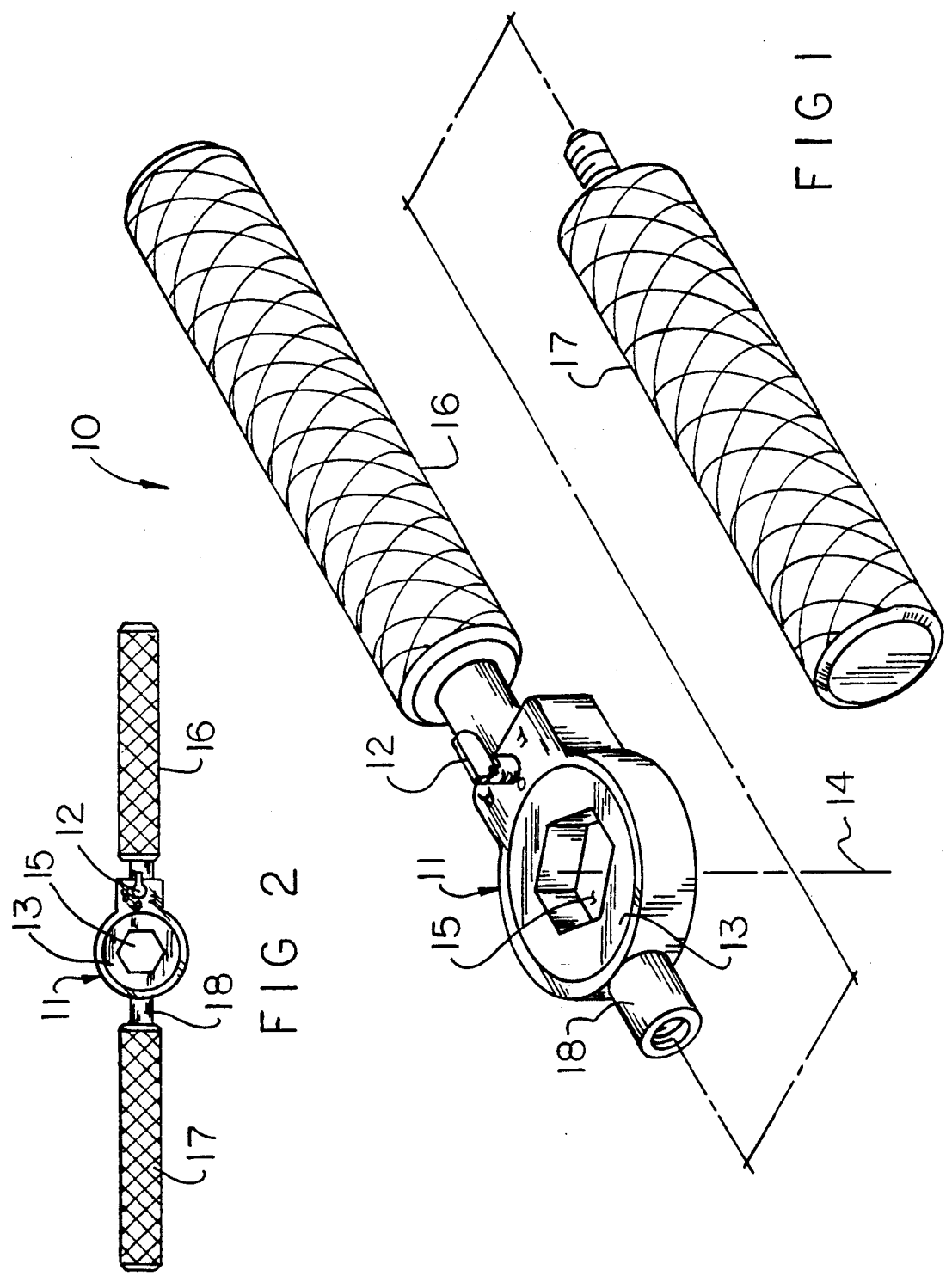

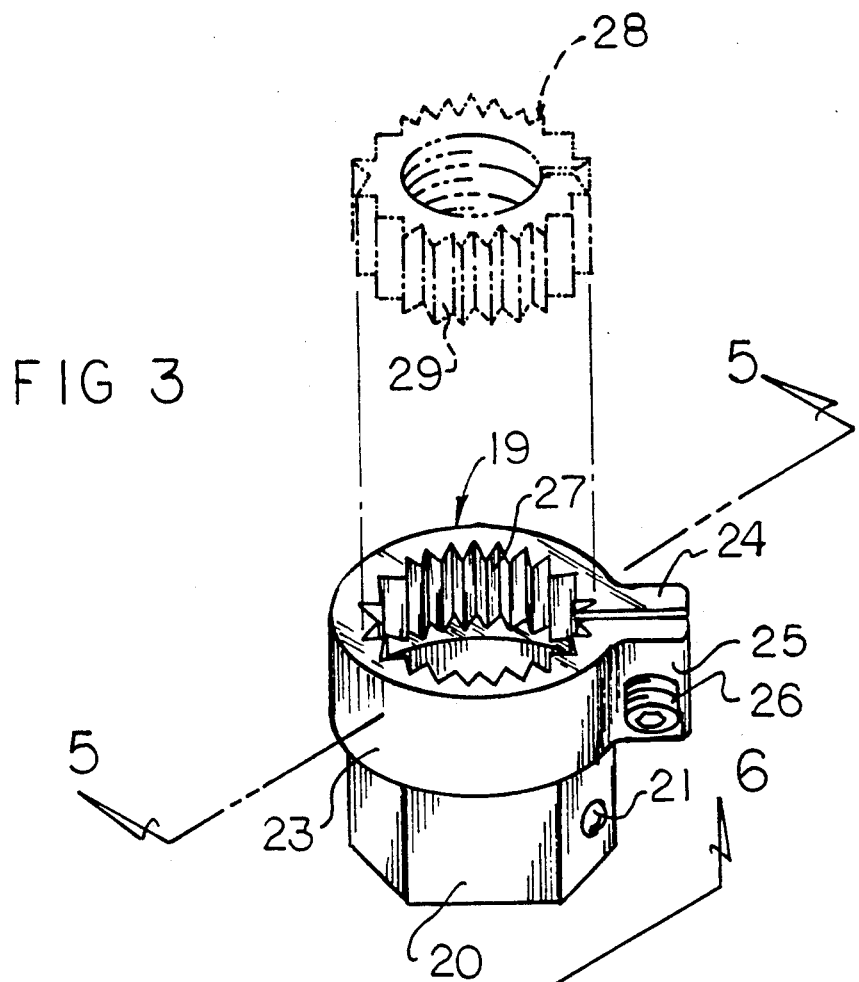
FIG 3
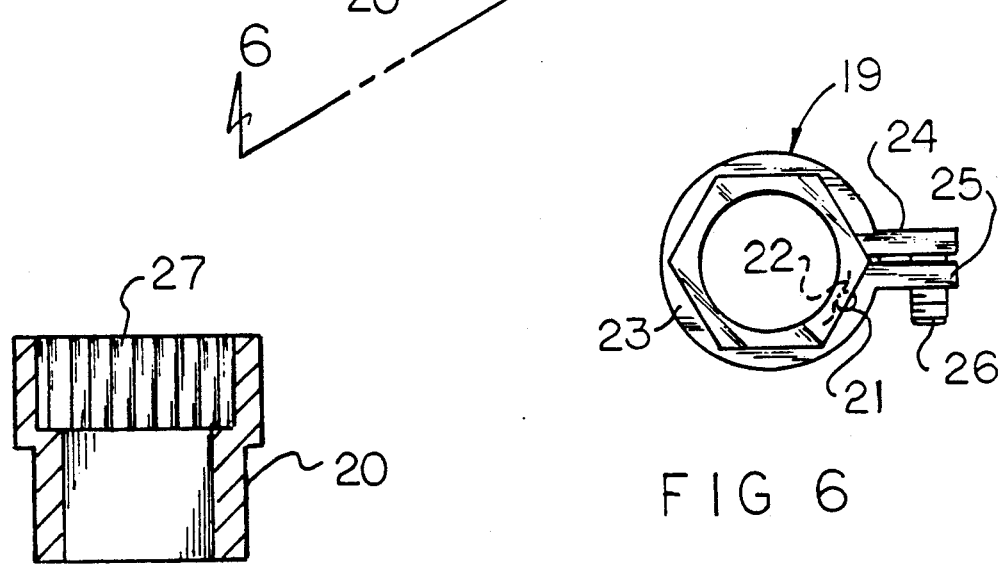
FIG 5
FIG 6

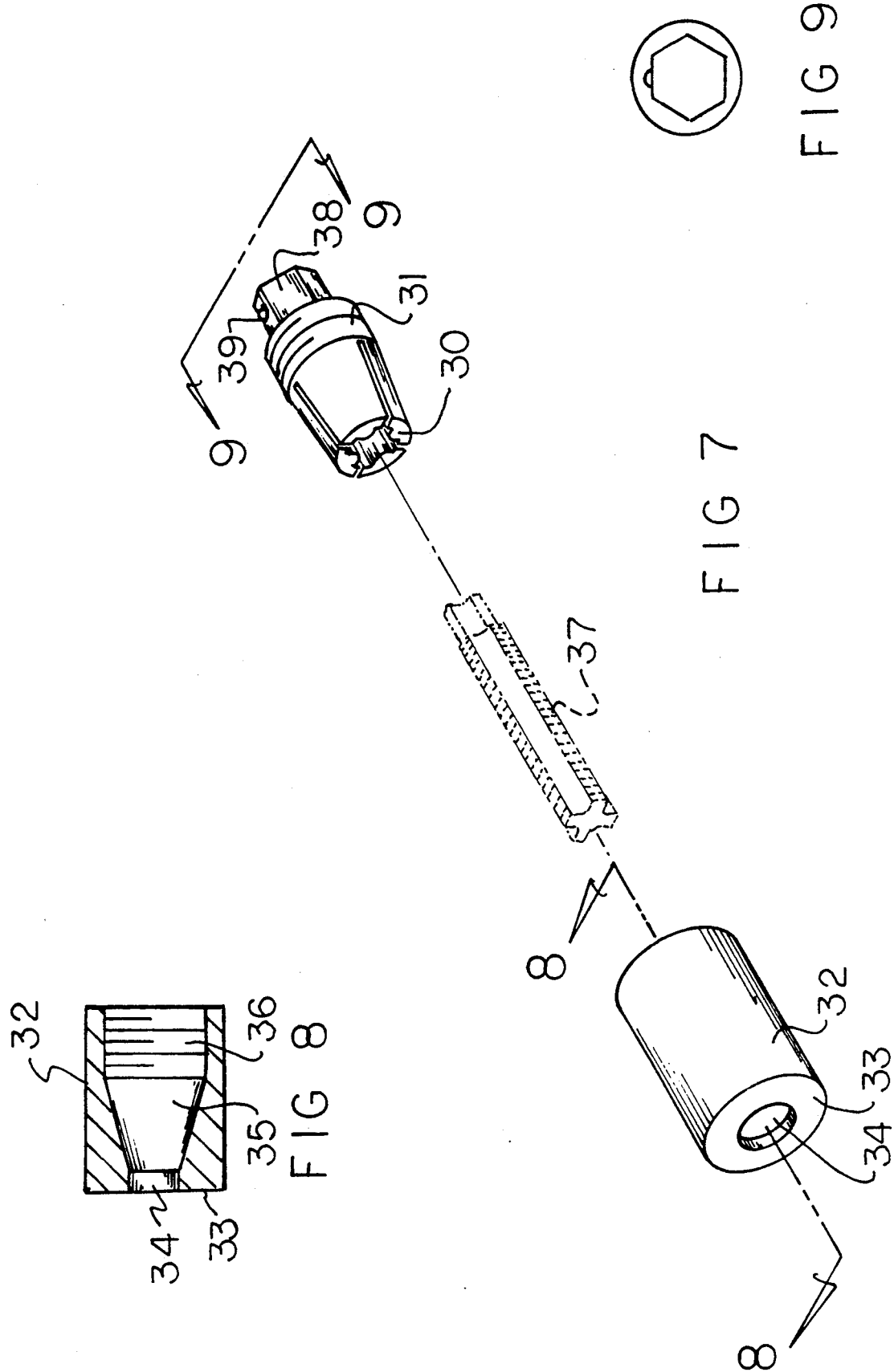

RATCHETING THREADING TOOL

BACKGROUND OF THE INVENTION

1. Field of the Invention

The field of invention relates to thread cutting tool structure, and more particularly pertains to a new and improved ratcheting threading tool wherein the same is arranged for the ratcheting of a die member or threading tap relative to the tool assembly.

2. Description of the Prior Art

Thread cutting tools of various types have been utilized throughout the prior art for the cutting of threads into a bore or about a cylindrical rod alternatively employing a tap or die structure. U.S. Pat. No. 3,811,145 to Fink sets forth a holder for mounting thread cutting dies as exemplary in the prior art, wherein the U.S. Pat. No. 4,927,302 to Beaty indicates a die member for the cutting of threads in a conventional manner.

The prior art has heretofore failed to provide for the convenience of a ratcheting head structure relative to a thread cutting tool organization and in this respect, the present invention substantially fulfills this need.

SUMMARY OF THE INVENTION

In view of the foregoing disadvantages inherent in the known types of thread cutting apparatus now present in the prior art, the present invention provides a ratcheting threading tool wherein the same is directed to the selective mounting of a die holder or tap holder in the cutting of threads. As such, the general purpose of the present invention, which will be described subsequently in greater detail, is to provide a new and improved ratcheting threading tool which has all the advantages of the prior art threading tool apparatus and none of the disadvantages.

To attain this, the present invention provides a tool member including a ratchet head having a central polygonal aperture arranged to selectively receive a die holder member or alternatively, a collect assembly for mounting a threading tap. A second handle member is arranged for selective securement to the head in longitudinal alignment relative to a first handle mounted to the ratcheting head, wherein the first and second handles are arranged on opposed sides of the mounting head orthogonally oriented relative to the head's axis.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved ratcheting threading tool which has all the advantages of the prior art threading tool apparatus and none of the disadvantages.

It is another object of the present invention to provide a new and improved ratcheting threading tool which may be easily and efficiently manufactured and marketed.

It is a further object of the present invention to provide a new and improved ratcheting threading tool which is of a durable and reliable construction.

An even further object of the present invention is to provide a new and improved ratcheting threading tool which is susceptible of a low cost of manufacture with regard to both materials and labor, and which accordingly is then susceptible of low prices of sale to the consuming public, thereby making such ratcheting threading tools economically available to the buying public.

Still yet another object of the present invention is to provide a new and improved ratcheting threading tool which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the tool structure of the invention.

FIG. 2 is an orthographic top view of the tool structure.

FIG. 3 is an isometric illustration of the die holder structure of the invention.

FIG. 5 is an orthographic view, taken along the lines 5—5 of FIG. 3 in the direction indicated by the arrows.

FIG. 6 is an orthographic view, taken along the lines 6—6 of FIG. 3 in the direction indicated by the arrows.

FIG. 7 is an isometric exploded illustration of the collet assembly utilized by the invention to secure a thread tap.

FIG. 8 is an orthographic view, taken along the lines 8—8 of FIG. 7 in the direction indicated by the arrows.

FIG. 9 is an orthographic view, taken along the lines 9—9 of FIG. 7 in the direction indicated by the arrows.

DESCRIPTION OF THE PREFERRED EMBODIMENT

Figure 4:
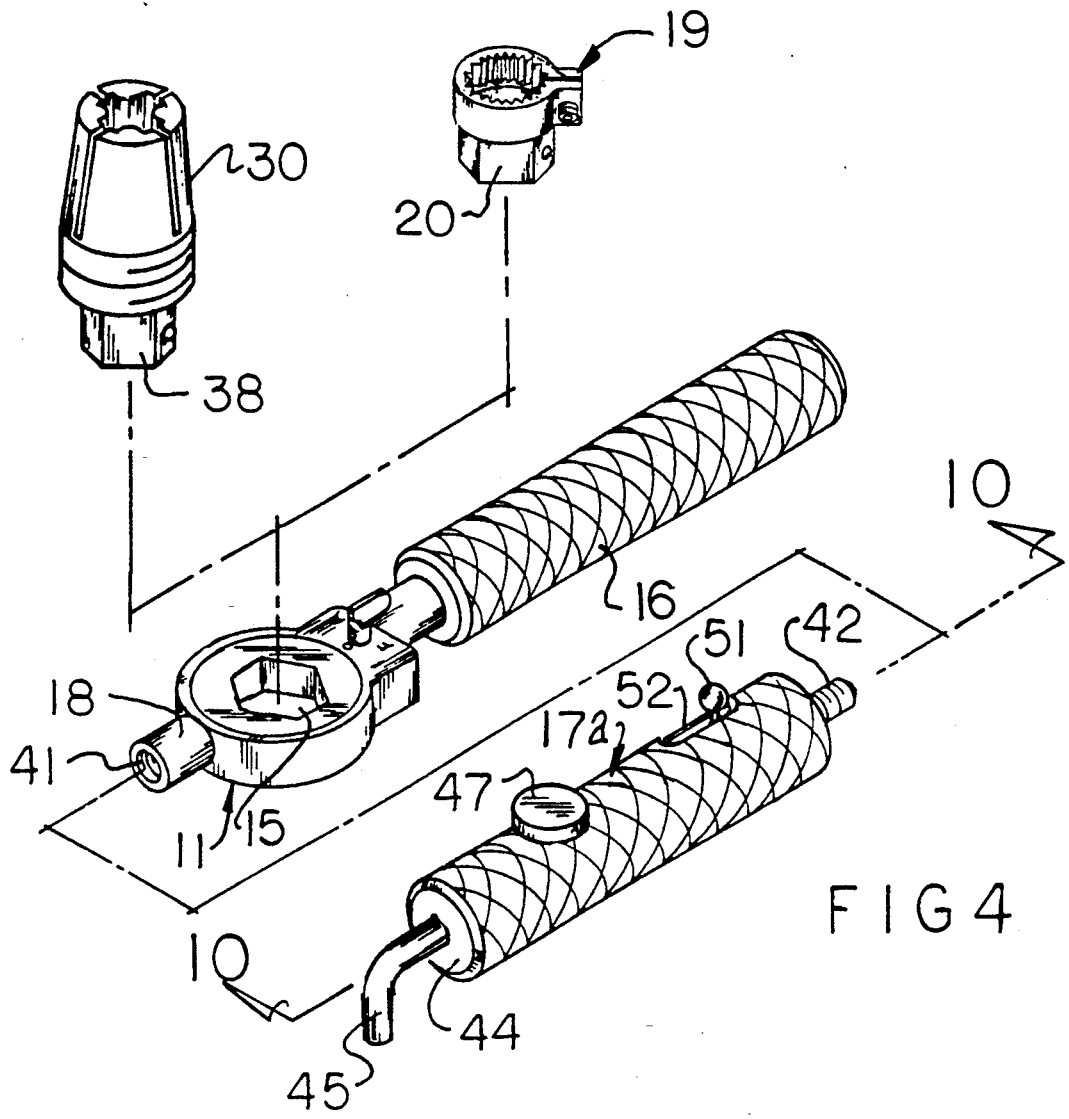
FIG. 4 is an isometric illustration of the invention utilizing a modified second handle construction.

With reference now to the drawings, and in particular to FIGS. 1 to 10 thereof, a new and improved ratcheting threading tool embodying the principles and concepts of the present invention and generally designated by the reference numeral 10 will be described.

More specifically, the threading ratcheting tool 10 of the instant invention essentially comprises a ratchet head 11 having a reversing lever 12 to operate a ratcheting mechanism of conventional construction within the ratchet head 11. A cylindrical rotary disc 13 is mounted in a ratcheting engagement with the ratcheting head 11 coaxially aligned therewith along a disc axis 14. A central polygonal aperture 15 directed coaxially through the disc 13 is coaxially aligned with the axis 14 for receiving a die holder member 19 or selectively, a collet assembly as indicated in FIG. 7 for example.

A first handle 16 is fixedly mounted to the head 11 orthogonally oriented relative to the axis 14, with a second handle 17 arranged for mounting to a threaded socket 18 and arranged for longitudinal alignment with the first handle 16 on opposed side of the head 11 orthogonally oriented relative to the axis 14.

The die holder member 19 includes a die holder polygonal shank 20 arranged for complementary reception within the polygonal aperture 15. A shank locking sphere 21 is mounted to the shank for engagement within the polygonal aperture 15. A locking sphere spring 22 is arranged within the shank 20 to bias the sphere 21 exteriorly of the shank 20 in a conventional manner.

The shank 20 includes a split collar 23 mounted fixedly thereon coaxially aligned therewith, with the split collar 23 including a first flange 24 in confronting relationship relative to a second flange 25, with the first and second flanges including a threaded lock rod 26 directed therethrough to direct the first flange to the second flange. It should be noted that the first flange and second flange are normally biased apart in a spaced relationship coextensive relative to one another, whereupon threaded projection of the lock rod 26 to bias the first flange with the second flange provides for constriction of the interiorly toothed bore wall 27 of the die holder member 19 to affix a thread cutting die 28 therewithin. The thread cutting die 28 includes a toothed exterior side wall 29 received within the toothed interior bore wall 27.

The FIG. 7 illustrates the collet assembly having a split conical collet 30, including a collet externally threaded base 31 for reception with a sleeve 32. The sleeve includes a sleeve end wall 33 having an end wall aperture 34 coaxially aligned with the collet 30. The sleeve further includes a sleeve conical cavity 35 for complementary reception of the collet 30 in adjacency to the end wall 33. A sleeve cylindrical cavity 36 that is internally threaded is arranged for threaded engagement with the threaded base 31 to project the collet 30 into the conical cavity 35 to effect closure of the collet for securement of a thread tap 37 therewithin. The collet includes a polygonal collet shank 38 coaxially aligned with the collet, and the collet shank 38 including a shank locking sphere 39 of a type as referenced relative to the die holder member 19 set forth as the shank locking sphere 21.

Figure 10:
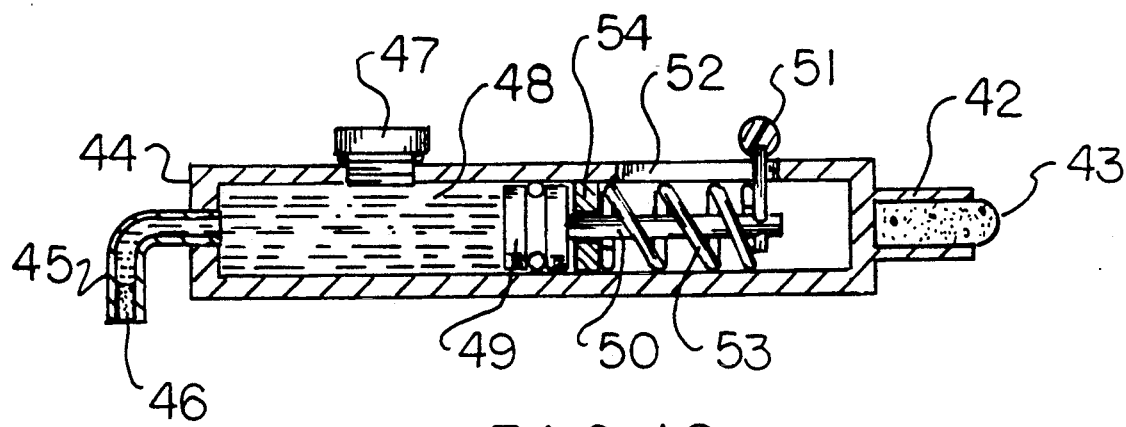
FIG. 10 is an orthographic view, taken along the lines 10—10 of FIG. 4 in the direction indicated by the arrows.

The FIGS. 4 and 10 indicate the organization having a modified second handle 17a relative to the handle, as indicated in FIG. 1. The second handle includes a second handle externally threaded boss 42 for reception within the threaded socket 18 that includes a through-extending bore 41 arranged for orthogonal communication with the polygonal aperture 15 of the ratchet head 11. In this manner, enhanced securement of the ratchet head 11 or the collet assembly is effected within the ratchet head 11. Further, a resilient core 43 is positioned within the boss 42 projecting exteriorly of the boss for frictional engagement with the die holder shank 20 or the collet shank 38. The second handle 17a further includes a second handle end wall 44 having a nozzle 45 directed therefrom terminating with a nozzle sponge metering plug 46 at a free end of the nozzle to meter fluid flow therefrom. A fill cap 47 mounted within the handle 17a is in communication with a fluid reservoir 48 within the handle having a thread cutting lubricating fluid therewithin. A piston 49 is mounted in coaxial alignment within the handle and it should be noted that the reservoir 48 is of a cylindrical configuration cooperative with the piston 49 of cylindrical construction. The piston 49 includes a piston rod 50 coaxially aligned with the piston terminating in a rod handle 51 that is orthogonally and fixedly mounted to the piston rod 50. The rod handle 51 projects through a handle slot 52 of the handle 17a, with a spring 53 interposed between the handle 51 and a reservoir wall 54 oriented between the piston and the handle 51. In this manner to direct fluid from the nozzle 45, manual projection of the handle 51 within the slot 52 biases the piston 49 against the fluid within the reservoir 48 to thereby pressurize the fluid and direct such fluid through the nozzle 45 and the sponge metering plug 46 for application to a surface to be threaded to enhance ease of threading.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A ratcheting threading tool, comprising, a ratcheting head, the ratchet head including a cylindrical rotary disc rotatably mounted within the ratcheting head arranged for ratcheting engagement relative to the ratcheting head, with the rotary disc and the ratcheting head coaxially aligned along a predetermined axle, and, the rotary disc including a central polygonal aperture directed through the rotary disc coaxially aligned relative to the predetermined axis, and, a first handle fixedly mounted to the ratcheting head, and, a threaded socket mounted to the ratcheting head longitudinally aligned with the first handle, and a second handle arranged for selective securement relative to the threaded socket, and, a die holder member, with the die holder member arranged for mounting within the polygonal aperture, and, a collet assembly, with the collet assembly arranged for mounting within the polygonal aperture, wherein the collet assembly is arranged for securement of a threading tap, and, the die holder member includes a die holder polygonal shank, and the die holder polygonal shank arranged for complementary reception within the polygonal aperture, and the die holder member further including a split collar mounted to the polygonal shank coaxially aligned therewith, with the split collar including a first flange and a second flange, with the first flange and second flange arranged in coextensive relationship relative to one another biased in a spaced relationship relative to one another projecting laterally beyond the die holder polygonal shank, and a threaded lock rod orthogonally directed through the first flange and the second flange for directing the first flange towards the second flange, with the split collar having a split collar bore directed therethrough, with the split collar bore further directed through the die holder polygonal shank, and the bore having a toothed interior bore wall, and a thread cutting die, wherein the thread cutting die includes a toothed exterior side wall arranged for complementary engagement with the toothed interior bore wall.

2. A tool as set forth in claim 1 wherein the collet assembly includes a split conical collet having a threaded cylindrical base coaxially aligned with the split conical collect, and the threaded base including a collet polygonal shank coaxially aligned with the threaded base, with the collet shank arranged for complementary reception within the polygonal aperture, and a collet sleeve, the collet sleeve including a collet sleeve end wall, the collet sleeve end wall having an end wall aperture, with the end wall coaxially aligned with the conical collet, and the sleeve having a conical cavity within the sleeve in adjacency relative to the sleeve end wall, and an internally threaded cylindrical cavity coaxially aligned with the conical cavity, with the cylindrical cavity complementarily receiving the collet threaded base to direct the conical collet into the conical cavity to permit engagement of the thread tap within the conical collet.

3. A tool as set forth in claim 2 wherein the threaded socket includes a socket through-extending bore coaxially aligned and intersecting the polygonal aperture of the ratchet head, and the second handle having a second handle externally threaded boss sleeve, and the boss sleeve including a resilient core, wherein the resilient core projects longitudinally beyond the boss sleeve for engagement with the collet shank and the die holder shank when directed within the polygonal aperture.

4. A tool as set forth in claim 3 wherein the second handle further includes a second handle end wall spaced from the boss sleeve, and the second handle end wall having a fluid nozzle, and the second handle having a fluid reservoir within the handle between the boss sleeve and the end wall, and the nozzle in fluid communication with the fluid reservoir, the nozzle having a sponge metering plug therewithin to meter fluid from the reservoir through the nozzle, and a fill cap mounted through the handle in fluid communication with the reservoir.

5. A tool as set forth in claim 4 wherein the second handle further includes a piston mounted within the fluid reservoir, the piston having a piston rod coaxially aligned relative to the piston, and a reservoir wall, with the piston rod slidably directed through the piston wall, and the piston rod having a rod handle orthogonally and fixedly mounted to the piston rod spaced from the reservoir wall, and the second handle having a second handle slot, with the rod handle slidably directed through the handle slot, and a spring interposed between the rod handle and the reservoir wall to bias the reservoir handle and the piston in a spaced relationship relative to the second handle end wall.

* * * * *